(12) United States Patent
Kohen (10) Patent No.: US 12,542,398 B2
(45) Date of Patent: Feb. 3, 2026

(54) QUICK CONNECT DEVICE WITH WIRE COVER

(71) Applicant: SKYX Platforms Corp., Johns Creek, GA (US)

(72) Inventor: Ran Roland Kohen, Aventura, FL (US)

(73) Assignee: SKYX Platforms Corp., Johns Creek, GA (US)

( * ) Notice: Subject to any disclaimer, the term of this patent is extended or adjusted under 35 U.S.C. 154(b) by 395 days.

(21) Appl. No.: 18/271,156

(22) PCT Filed: Jan. 7, 2022

(86) PCT No.: PCT/US2022/011701
§ 371 (c)(1),
(2) Date: Jul. 6, 2023

(87) PCT Pub. No.: WO2022/150645
PCT Pub. Date: Jul. 14, 2022

(65) Prior Publication Data
US 2024/0088608 A1    Mar. 14, 2024

Related U.S. Application Data

(60) Provisional application No. 63/134,760, filed on Jan. 7, 2021.

(51) Int. Cl.
*H01R 13/627* (2006.01)
*H01R 13/10* (2006.01)
(Continued)

(52) U.S. Cl.
CPC ......... *H01R 13/6276* (2013.01); *H01R 13/10* (2013.01); *H01R 24/38* (2013.01); *H02G 3/081* (2013.01)

(58) Field of Classification Search
CPC .... H01R 13/6276; H01R 13/10; H01R 24/38; H02G 3/081
(Continued)

(56) References Cited

U.S. PATENT DOCUMENTS

| 484,911 A | 10/1892 | Green |
|---|---|---|
| 1,595,972 A | 8/1926 | DeReamer |

(Continued)

FOREIGN PATENT DOCUMENTS

| CA | 2549756 A1 | 12/2007 |
|---|---|---|
| CN | 2586059 Y | 11/2003 |

(Continued)

OTHER PUBLICATIONS

Office Action dated Jan. 28, 2022 for U.S. Appl. No. 17/240,102, filed Apr. 26, 2021.
(Continued)

*Primary Examiner* — Tulsidas C Patel
*Assistant Examiner* — Thaslimur Rahman
(74) *Attorney, Agent, or Firm* — Fleit Intellectual Property Law; Paul D. Bianco (57) ABSTRACT

A quick-connect plug and socket for mechanically and electrically attaching an electrical fixture. The plug has a spindle insertable into a bore of the socket to mechanically engage the plug and socket. An electrical connection forms between ring-shaped conductors on the plug that insert into ring-shaped openings in the socket to engage contacts within the socket. The plug body includes an extension extending from a side of the body to the spindle. The extension has a channel and slot, through which an electrical cord with wires inserts without threading the cord through the extension. The cord turns away from the extension to lie in a channel in the body and extend to a periphery of the body, to then connect to electrical terminals of the body. A removable cover covers (Continued)

the cord in the channel, the terminals, and the portion of wire that passes from the periphery to the terminals.

20 Claims, 4 Drawing Sheets

(51) Int. Cl.
    *H01R 24/38*     (2011.01)
    *H02G 3/08*     (2006.01)

(58) Field of Classification Search
    USPC ........................................................ 439/345
    See application file for complete search history.

(56) References Cited

U.S. PATENT DOCUMENTS

| | | |
|---|---|---|
| 1,897,954 A | 2/1933 | D'Olier |
| 2,077,587 A | 4/1937 | Raymond |
| 2,308,016 A | 1/1943 | Mihalyi |
| 2,313,481 A | 3/1943 | Rendano |
| 2,494,428 A | 1/1950 | Buck |
| 2,673,966 A | 3/1954 | Larkin |
| 2,726,372 A | 12/1955 | Appleton |
| 2,728,895 A | 12/1955 | Quackenbush |
| 2,863,037 A | 12/1958 | Johnstone |
| 3,056,035 A | 9/1962 | Bernheim |
| 3,118,713 A | 1/1964 | Ellis |
| 3,159,444 A | 12/1964 | Stine |
| 3,193,636 A | 7/1965 | Daniels |
| 3,386,071 A | 5/1968 | Allen |
| 3,398,260 A | 8/1968 | Martens |
| 3,521,216 A | 7/1970 | Tolegian |
| 3,585,564 A | 6/1971 | Skjervoll |
| 3,648,002 A | 3/1972 | Du Rocher |
| 3,651,443 A | 3/1972 | Quilez |
| 3,668,603 A | 6/1972 | Burgess et al. |
| 3,798,584 A | 3/1974 | Person |
| 3,808,577 A | 4/1974 | Mathauser |
| 3,813,478 A | 5/1974 | Ervin |
| 3,855,564 A | 12/1974 | Dumas |
| 3,871,732 A | 3/1975 | Appleton |
| 4,059,327 A | 11/1977 | Vann |
| 4,079,244 A | 3/1978 | Bortoluzzi |
| 4,083,619 A | 4/1978 | McCormick et al. |
| 4,107,770 A | 8/1978 | Weber |
| 4,133,594 A | 1/1979 | Laverick et al. |
| 4,335,927 A | 6/1982 | Allen et al. |
| 4,448,388 A | 5/1984 | Dennis |
| 4,462,653 A | 7/1984 | Flederbach |
| 4,473,869 A | 9/1984 | De Widt |
| 4,588,248 A | 5/1986 | Moore |
| 4,629,843 A | 12/1986 | Kato et al. |
| 4,631,648 A | 12/1986 | Nilssen |
| 4,681,385 A | 7/1987 | Kruger |
| 4,753,600 A | 6/1988 | Williams |
| 5,003,128 A | 3/1991 | Grondin |
| 5,034,869 A | 7/1991 | Choi |
| 5,173,053 A | 12/1992 | Swanson et al. |
| 5,250,874 A | 10/1993 | Hall et al. |
| 5,352,122 A | 10/1994 | Speyer |
| 5,362,122 A | 11/1994 | Reihl et al. |
| 5,438,216 A | 8/1995 | Juskey et al. |
| 5,442,532 A | 8/1995 | Boulos et al. |
| 5,494,325 A | 2/1996 | Liu et al. |
| 5,494,326 A | 2/1996 | Hinds |
| 5,536,685 A | 7/1996 | Burward-Hoy |
| 5,551,882 A | 9/1996 | Whiteman |
| 5,562,458 A | 10/1996 | Stora et al. |
| 5,584,726 A | 12/1996 | Le Gallic |
| 5,600,537 A | 2/1997 | Gordin |
| 5,622,873 A | 4/1997 | Kim et al. |
| 5,668,920 A | 9/1997 | Pelonis |
| 5,710,541 A | 1/1998 | Stanley |
| 5,754,408 A | 5/1998 | Derouiche |
| 5,777,391 A | 7/1998 | Nakamura et al. |
| 5,790,381 A | 8/1998 | Derouiche et al. |
| 5,803,590 A | 9/1998 | Wedell et al. |
| 5,808,556 A | 9/1998 | Nelson |
| 5,836,781 A | 11/1998 | Hyzin |
| 5,952,714 A | 9/1999 | Sano et al. |
| 5,962,810 A | 10/1999 | Glenn |
| 6,064,155 A | 5/2000 | Maya |
| 6,068,490 A | 5/2000 | Salzberg |
| 6,093,029 A | 7/2000 | Kwon et al. |
| 6,129,598 A | 10/2000 | Yu et al. |
| 6,135,800 A | 10/2000 | Majors |
| 6,170,967 B1 | 1/2001 | Usher et al. |
| 6,175,159 B1 | 1/2001 | Sasaki |
| 6,240,247 B1 | 5/2001 | Reiker |
| 6,241,559 B1 | 6/2001 | Taylor |
| 6,325,654 B1 | 12/2001 | Kerr |
| 6,332,794 B1 | 12/2001 | Tzeng Jeng |
| 6,340,790 B1 | 1/2002 | Gordin et al. |
| 6,364,716 B1 | 4/2002 | Seo |
| 6,366,733 B1 | 4/2002 | Reiker |
| 6,398,392 B2 | 6/2002 | Gordin et al. |
| 6,422,722 B1 | 7/2002 | Voltolina |
| 6,517,223 B2 | 2/2003 | Hsu |
| 6,595,782 B1 | 7/2003 | Hsiao |
| 6,598,990 B2 | 7/2003 | Li |
| 6,631,243 B2 | 10/2003 | Reiker |
| 6,648,488 B1 | 11/2003 | Pearce |
| 6,751,406 B2 | 6/2004 | Reiker |
| 6,793,383 B2 | 9/2004 | Wu |
| 6,821,089 B2 | 11/2004 | Bilskie |
| 6,837,754 B1 | 1/2005 | Walton |
| 6,930,250 B1 | 8/2005 | Drane |
| 6,962,498 B2 | 11/2005 | Kohen |
| 7,001,199 B1 | 2/2006 | Badalpour |
| 7,052,301 B2 | 5/2006 | Garcia et al. |
| 7,066,739 B2 | 6/2006 | McLeish |
| 7,192,303 B2 | 3/2007 | Kohen |
| 7,462,066 B2 | 12/2008 | Kohen |
| 7,467,881 B2 | 12/2008 | McMillen |
| 7,569,710 B1 | 8/2009 | Ozero |
| 7,706,757 B2 | 4/2010 | Luglio et al. |
| 7,723,862 B1 | 5/2010 | Spillman et al. |
| 7,878,691 B2 | 2/2011 | Liang |
| 7,891,841 B2 | 2/2011 | Levine |
| 8,123,378 B1 | 2/2012 | Ruberg et al. |
| 8,186,852 B2 | 5/2012 | Dassanayake et al. |
| 8,192,057 B2 | 6/2012 | Dassanayake et al. |
| 8,235,549 B2 | 8/2012 | Tyco |
| 8,277,082 B2 | 10/2012 | Dassanayake et al. |
| 8,348,678 B2 | 1/2013 | Hardisty |
| 8,354,768 B2 | 1/2013 | Cipriani |
| 8,357,016 B2 | 1/2013 | Schumacher |
| 8,419,218 B2 | 4/2013 | Dassanayake et al. |
| 8,449,137 B2 | 5/2013 | Dassanayake et al. |
| 8,558,413 B1 | 10/2013 | Lepard |
| D693,765 S | 11/2013 | Workman |
| 8,702,435 B2 | 4/2014 | Tajima |
| 8,854,796 B2 | 10/2014 | Wilcox |
| 8,888,326 B2 | 11/2014 | Hatch |
| 8,894,247 B2 | 11/2014 | Kim et al. |
| 8,979,347 B2 | 3/2015 | Holman |
| 9,328,910 B2 | 5/2016 | Lin et al. |
| 9,500,352 B2 | 11/2016 | Van Winkle |
| 9,644,824 B2 | 5/2017 | Dassanayake et al. |
| 9,702,535 B2 | 7/2017 | Dassanayake et al. |
| 9,901,039 B1 | 2/2018 | Dellerson et al. |
| 9,903,576 B2 | 2/2018 | Creasman et al. |
| 10,208,977 B2 | 2/2019 | Bhide |
| 10,266,998 B2 | 4/2019 | Apostolopoulos |
| 10,317,015 B2 | 6/2019 | Joye |
| 10,326,247 B2 | 6/2019 | Kohen |
| 10,326,274 B2 | 6/2019 | Kempen |
| 10,845,046 B2 | 11/2020 | Kohen |
| 11,196,216 B2 | 12/2021 | Kohen |
| 11,460,184 B2 | 10/2022 | Kohen |
| 2002/0060369 A1 | 5/2002 | Akram |
| 2002/0064380 A1 | 5/2002 | Reiker |
| 2002/0081107 A1 | 6/2002 | Reiker |

(56) References Cited

U.S. PATENT DOCUMENTS

| | | |
|---|---|---|
| 2003/0012027 A1 | 1/2003 | Hsu |
| 2003/0107891 A1 | 6/2003 | Kohen |
| 2004/0192415 A1 | 9/2004 | Luglio et al. |
| 2004/0223331 A1 | 11/2004 | Kao |
| 2005/0148241 A1 | 7/2005 | Kohen |
| 2006/0044789 A1 | 3/2006 | Curtis |
| 2006/0141842 A1 | 6/2006 | Sauer |
| 2006/0146527 A1 | 7/2006 | Vanderschuit |
| 2007/0105414 A1 | 5/2007 | Kohen |
| 2007/0167072 A1* | 7/2007 | Kohen ................ F21V 23/06 439/552 |
| 2007/0258202 A1 | 11/2007 | Cooley et al. |
| 2008/0146064 A1 | 6/2008 | Bankstahl |
| 2008/0225531 A1 | 9/2008 | Shiller |
| 2009/0035970 A1 | 2/2009 | Kohen |
| 2009/0111322 A1 | 4/2009 | Roland |
| 2009/0129974 A1 | 5/2009 | McEllen |
| 2009/0135608 A1 | 5/2009 | Sell |
| 2009/0280673 A1 | 11/2009 | Kohen |
| 2009/0280675 A1 | 11/2009 | Zhou |
| 2010/0020550 A1 | 1/2010 | Kawashima |
| 2010/0214775 A1 | 8/2010 | Liang |
| 2010/0295473 A1 | 11/2010 | Chemel et al. |
| 2010/0296285 A1 | 11/2010 | Chemel |
| 2010/0301769 A1 | 12/2010 | Chemel et al. |
| 2011/0060701 A1 | 3/2011 | Verfuerth et al. |
| 2011/0134239 A1 | 6/2011 | Vadai et al. |
| 2012/0196471 A1 | 8/2012 | Guo |
| 2013/0040471 A1 | 2/2013 | Gervais |
| 2013/0107536 A1 | 5/2013 | Hiraoka |
| 2014/0168944 A1 | 6/2014 | Osada et al. |
| 2014/0211487 A1 | 7/2014 | Spiro |
| 2014/0225731 A1 | 8/2014 | Gouveia |
| 2014/0263903 A1 | 9/2014 | Ostrobrod |
| 2014/0268790 A1 | 9/2014 | Chobot |
| 2014/0301071 A1 | 10/2014 | Jørgensen |
| 2015/0009666 A1 | 1/2015 | Keng et al. |
| 2015/0009676 A1 | 1/2015 | Danesh |
| 2015/0044040 A1 | 2/2015 | Oda et al. |
| 2015/0085500 A1 | 3/2015 | Cooper |
| 2016/0053952 A1 | 2/2016 | Kuti et al. |
| 2016/0069556 A1 | 3/2016 | Li |
| 2016/0074574 A1 | 3/2016 | Welsch |
| 2016/0123374 A1 | 5/2016 | Roberts |
| 2016/0131358 A1 | 5/2016 | Spiro |
| 2016/0255697 A1 | 9/2016 | Bhide |
| 2017/0105265 A1 | 4/2017 | Sadwick |
| 2017/0234319 A1 | 8/2017 | Seccareccia |
| 2017/0248148 A1 | 8/2017 | Kohen |
| 2018/0115131 A1 | 4/2018 | Kohen |
| 2018/0169279 A1 | 6/2018 | Randers-Pehrson et al. |
| 2019/0224350 A1 | 7/2019 | Marry et al. |
| 2019/0312396 A1 | 10/2019 | Kohen |
| 2020/0018469 A1 | 1/2020 | Kohen |
| 2020/0056773 A1 | 2/2020 | Kohen |
| 2020/0144766 A1* | 5/2020 | Kohen ................ H01R 24/76 |
| 2021/0296819 A1 | 9/2021 | Kohen |
| 2022/0190518 A1 | 6/2022 | Kohen |
| 2023/0204200 A1 | 6/2023 | Kohen |
| 2023/0233719 A1 | 7/2023 | Kohen |
| 2024/0243538 A1 | 7/2024 | Kohen |

FOREIGN PATENT DOCUMENTS

| | | |
|---|---|---|
| CN | 1582518 A | 2/2005 |
| CN | 1728475 A | 2/2006 |
| CN | 01 8 23877.7 | 11/2007 |
| CN | 101095268 A | 12/2007 |
| CN | 102483213 A | 5/2012 |
| CN | 202253241 U | 5/2012 |
| CN | 202501418 U | 10/2012 |
| CN | 102870307 A | 1/2013 |
| CN | 104033399 A | 9/2014 |
| CN | 203934061 U | 11/2014 |
| CN | 204879746 U | 12/2015 |
| CN | 105674223 A | 6/2016 |
| CN | 107211515 A | 9/2017 |
| CN | 115668663 A | 1/2023 |
| DE | 19849101 A1 | 4/1999 |
| DE | 29923352 U1 | 8/2000 |
| DE | 20203467 U1 | 6/2002 |
| EP | 0704934 A2 | 4/1996 |
| EP | 1024559 A2 | 8/2000 |
| EP | 1456914 A1 | 9/2004 |
| EP | 1789984 A2 | 5/2007 |
| EP | 3295525 A1 | 5/2016 |
| IL | 126246 | 8/2001 |
| JP | 53-026859 A | 3/1978 |
| JP | 2003-16831 A | 1/2003 |
| JP | 2004-320228 A | 11/2004 |
| JP | 2008166071 A | 7/2008 |
| JP | 2010-129489 A | 6/2010 |
| JP | 5331043 B2 | 10/2013 |
| JP | 7291880 | 6/2023 |
| RU | 2009583 C1 | 3/1994 |
| RU | 2275720 C2 | 4/2006 |
| RU | 2011122686 | 10/2012 |
| RU | 2526853 | 8/2014 |
| WO | 00/16442 | 3/2000 |
| WO | 01/01047 A1 | 1/2001 |
| WO | 03/044906 A1 | 5/2003 |
| WO | 2005/053100 A2 | 6/2005 |
| WO | 2005/074087 A1 | 8/2005 |
| WO | 2005/074087 A2 | 8/2005 |
| WO | 2006/031853 A2 | 3/2006 |
| WO | 2006/060772 A2 | 6/2006 |
| WO | 2010/064914 A1 | 6/2010 |
| WO | 2011/005526 A2 | 1/2011 |
| WO | 2011/020231 A1 | 2/2011 |
| WO | 2011/134709 A2 | 11/2011 |
| WO | 2013/159833 A1 | 10/2012 |
| WO | 2012/167320 A1 | 12/2012 |
| WO | 2016/009181 A1 | 1/2016 |
| WO | 2016/054159 A1 | 4/2016 |
| WO | 2016/144795 A1 | 9/2016 |
| WO | 2016/183354 A1 | 11/2016 |
| WO | 2018/165646 | 9/2018 |
| WO | 2018/165646 A1 | 9/2018 |
| WO | 2018/165058 | 10/2018 |
| WO | 2018/195068 | 10/2018 |
| WO | 2018204313 A1 | 11/2018 |
| WO | 2019/222259 A1 | 11/2019 |
| WO | 2020/039215 A1 | 2/2020 |
| WO | 2020/172390 A1 | 8/2020 |
| WO | 2021/174187 A1 | 9/2021 |
| WO | 2021/226018 A1 | 11/2021 |
| WO | 2022/150645 A1 | 7/2022 |
| WO | 2022/159853 A1 | 7/2022 |

OTHER PUBLICATIONS

Office Action dated Dec. 13, 2021 issued by the European Patent Office for Application No. 15 846 948.6.
Response to Office Action, dated Jan. 12, 2022, for Mexican Patent Appl. No. MX/A/2017/004137.
International Preliminary Report on Patentability dated Jul. 20, 2023 for PCT/US2022/013598 filed Jan. 25, 2022.
Decision of Refusal (Office Action) dated Sep. 13, 2022 for Japanese Patent Application No. 2019-548272.
Office Action dated Feb. 1, 2024 for Israeli Patent Application No. 269246 (with English summary).
For Canadian Patent Application No. 3,055,254: Office Action dated Nov. 21, 2023.
For Canadian Patent Application No. 3,055,772: Office Action dated Nov. 15, 2023.
For Canadian Patent Application No. 3,062,157: Office Action dated Nov. 23, 2023.
For Canadian Patent Application 2,985,821: Office Action dated Jun. 16, 2023 Response filed Oct. 16, 2023.
First Office Action dated Sep. 2, 2020 for Chinese Application No. 201880030051.5 with translation of cover page (12 pages).

(56) References Cited

OTHER PUBLICATIONS

Response to First Examination Report, filed Sep. 4, 2020 for Indian Patent Application No. 201717013438, National Stage of PCT/US2015/053138.
Office Action dated Aug. 3, 2020, for European Patent Application No. 16793548.5 (Regional Stage of PCT/US2016/032170).
International Preliminary Report on Patentability dated Nov. 5, 2019 for International Application No. PCT/US2018/030372 filed May 1, 2018, 6 pages.
Written Opinion for International Application No. PCT/US2018/030372 filed May 1, 2018, 5 pages.
For Chinese Patent Application No. 201580063483.2 (national stage of PCT/US2015/053138): Third Office Action, dated Sep. 18, 2019 (with English translation) Response to Third Office Action, dated Dec. 2, 2019 (13 pages).
For Chinese Patent Application No. 201580063483.2 (national stage of PCT/US2015/053138): Response to First Office Action, dated Feb. 11, 2019 (9 pages) Response to Second Office Action, dated Aug. 26, 2019 (12 pages_.
For Chinese Patent Application No. 2016800404661 (national stage of PCT/US2016/032170): Second Office Action, dated Dec. 2, 2019 (3 pages) Search Report, dated Nov. 24, 2019 (2 pages).
For Indian Patent Application No. 201717013438 (National Stage of PCT/US2015/053138): First Examination Report, dated Dec. 13, 2019 (6 pages).
International Search Report with Written Opinion dated Aug. 13, 2018 for PCT/US2018/030372.
Office Action dated Sep. 25, 2018 from Chinese Patent Office for Application No. 201580063483.2.
European Search Report dated Oct. 21, 2020 for EP 18764255.8.
For Brazilian Patent Application No. BR 11 2017 024224-9 (National Stage of PCT/US2016/032170): Response filed Oct. 14, 2020.
International Preliminary Report on Patentability dated Sep. 10, 2019 with Written Opinion for PCT/US2018/021919, filed Mar. 12, 2018.
First Office Action dated Aug. 13, 2020 for Chinese Application No. 2018800295358.
Search Report dated Aug. 7, 2020 for Chinese Application No. 2018800295358.
International Search Report dated Jul. 18, 2016 for International Application No. PCT/US2016/032170, filed May 12, 2016.
Written Opinion for International Application No. PCT/US2016/032170, filed May 12, 2016.
Office Action dated Oct. 28, 2022 for European Patent Application No. 18 764 255.8 (11 pages).
International Search Report and Written Opinion dated Mar. 23, 2022 for PCT/US2022/011701 filed Jan. 7, 2022.
International Search Report, Written Opinion, International Preliminary Report on Patentability for PCT/US2004/039399 filed Nov. 22, 2004.
International Search Report, Written Opinion, International Preliminary Report on Patentability for PCT/US2005/032661 filed Sep. 14, 2005.
International Search Report, Written Opinion, International Preliminary Report on Patentability for PCT/US2005/043934 filed Dec. 2, 2005.
International Search Report, Written Opinion, International Preliminary Report on Patentability for PCT/US2015/53138 filed Sep. 30, 2015.
International Search Report and Written Opinion for PCT/US2016/32170 filed May 12, 2016.
European Search Report for EP05796234 dated Nov. 5, 2007 (related to WO2006/031853).
International Search Report for PCT/IL01/01078 filed Nov. 22, 2001.
First Notification of Office Action dated Nov. 19, 2020, for Chinese Application No. 2018800333913, National Stage of PCT/US2018/027956 10 pages (with partial English translation).
First Office Action dated Dec. 23, 2020, for Israeli Patent Application No. 255549, National Stage of PCT/US2016/32170 7 pages.
Office Action dated Jan. 27, 2021, for U.S. Appl. No. 15/515,664, filed Mar. 30, 2017 67 pages.
For Brazilian Appl. No. BR112019023032-7 (national stage of PCT/US2018/030372): Technical and Search Report, dated Sep. 13, 2022 Response, dated Dec. 14, 2022.
For Brazilian Patent Application No. BR 11 2017 024224-9 (National Stage of PCT/US2016/032170): Amended claims filed May 7, 2019 Response filed Jun. 19, 2023.
Office Action dated Nov. 4, 2022 for European Patent Application No. 16 793 548.5.
International Preliminary Report on Patentability, dated Aug. 30, 2022, for PCT/US2021/020233.
Response to Office Action filed Nov. 3, 2022 for Indian Patent Application No. 201937046706.
International Search Report and Written Opinion for PCT/US2018/21919 filed Mar. 12, 2018.
International Search Report and Written Opinion for PCT/US2018/20987 filed Mar. 5, 2018.
European Search Report dated Jul. 3, 2018 for Application No. 15846948.6.
Response filed Jan. 17, 2019, in U.S. Appl. No. 15/573,606.
Chinese Search Report dated Feb. 18, 2019, for Patent Application No. 2016800404661.
First Office Action dated Feb. 27, 2019, from Chinese Patent Office for Patent Application No. 201680040466.1.
International Preliminary Report on Patentability dated Nov. 14, 2017 for International Application No. PCT/US2016/032170 filed May 12, 2016.
First Examination Report for Mexican Patent Application No. MX/a/2017/004137, dated Aug. 10, 2021.
Office Action dated Sep. 1, 2022 for Canadian Application No. 2,985,821.
Office Action dated Mar. 27, 2023 for Korean Patent Application No. 10-2017-7035630.
Notice of Allowance dated Jul. 8, 2020 for U.S. Appl. No. 16/609,875.
Technical Examination Report dated Mar. 13, 2023 for Brazilian Application No. BR112017024224-9.
First Examination Report (FER) dated Feb. 13, 2022, and Response, dated Aug. 18, 2022, for Indian Application No. 201937049201 (17 pages).
International Preliminary Report on Patentability and Written Opinion dated Nov. 8, 2022 for PCT/US2021/030568, filed May 4, 2021.
Japanese Notice of Allowance dated Mar. 16, 2023 for Japanese Patent Application No. 2019-548272.
For Japanese Application No. 2019-548872: Notification of Reasons for Refusal dated Dec. 12, 2022.
Notification on Publication of Patent, dated Feb. 3, 2023, for Chinese Patent Application No. 202180031100.9.
Notice of Allowance dated Feb. 2, 2021 for U.S. Appl. No. 16/443,207 61 pages.
Publication issued in the Official Gazette from Mexican Patent Application MX/a/2017/004137 dated Feb. 13, 2018, 3 pages.
Office Action dated Nov. 24, 2022 for Israeli Application No. 269246 and translation of Summary.
Office Action dated Jan. 5, 2023 for U.S. Appl. No. 17/432,155, filed Aug. 19, 2021.
Notification of Reasons for Refusal, Office Action dated Jan. 4, 2022, for Japanese Patent Appl. No. 2019-548872 (18 pages with English translation).
International Preliminary Report on Patentability dated Jul. 4, 2023 for PCT/US2022/011701.
Communication dated Nov. 17, 2020 for European Patent Application No. 187636469.
Supplemental European Search Report dated Oct. 30, 2020 for European Patent Application No. 187636469.
For Russian Patent Application 2017142137 (national Stage of PCT/US2016/032170): Prosecution history including decision to grant dated Oct. 25, 2019.
Office Action issued by the European Patent Office dated Dec. 19, 2019 for Application No. 16 793 548.5-1201.
For Russian Application No. 2021127449 filed Feb. 20, 2020: Russian Office Action dated May 16, 2023 Russian Search Report dated May 11, 2023.

(56) References Cited

OTHER PUBLICATIONS

International Search Report and Written Opinion dated Apr. 8, 2022 for PCT/US2022/013598 filed Jan. 25, 2022.
Office Action dated Dec. 20, 2023 for Canadian Patent Application No. 3,130,493.
International Preliminary Report on Patentability dated Aug. 10, 2021 with Written Opinion for PCT/US2020/019010.
Second Office Action for Chinese Patent Application No. 201580063483.2, dated Jun. 14, 2019 (with translation of cover page).
Notice of Allowance dated Oct. 26, 2023 for U.S. Appl. No. 17/432,155.
International Search Report with Written Opinion dated Jul. 6, 2018 for PCT/US2018/027956.
Office Action dated Sep. 18, 2018 in U.S. Appl. No. 15/573,606.
Office Action dated Jun. 28, 2024 for Mexican Patent Application MX/a/2021/010076 filed Feb. 20, 2020.
European Search Report for Application No. 16793548.5 dated Feb. 14, 2019.
Oficial Communication dated Aug. 22, 2023 for Inian Patnt Application No. 201937040845.
International Search Report and Written Opinion dated Jun. 17, 2021, for PCT/US2021/020233.
Amendment and Statement of Argument filed with the Japanese Patent Office on Aug. 6, 2021 for Japanese Patent Application No. 2018-511347.
For U.S. Appl. No. 17/907,753 Office Action dated May 29, 2024.
Ex parte Quayle Office Action dated May 16, 2023, for U.S. Appl. No. 17/432,155.
International Search Report dated May 25, 2020 for PCT/US2020/019010 filed Feb. 20, 2020.
Written Opinion dated May 25, 2020 for PCT/US2020/019010 filed Feb. 20, 2020.
European Search Report dated Feb. 20, 2024 for European Patent Application No. 21759787.1.
European Search Report dated Oct. 14, 2024 for European Patent Application No. 22737210.0.
Notice of Allowance dated Mar. 14, 2024 for Canadian Patent Application No. 2,985,821.
International Search Report dated Aug. 4, 2021 for PCT/US2021/030568, filed May 4, 2021.
Written Opinion dated Aug. 4, 2021 for PCT/US2021/030568, filed May 4, 2021.
Office Action for Canadian Patent Application No. 3,169,781 dated Feb. 5, 2024 (4 pages).
Response submitted for Canadian Patent Application No. 3,055,254, dated Mar. 21, 2024 (19 pages).
Search Report dated Oct. 17, 2022 for European Patent Application No. 20768521.7.
Notice of Allowance dated May 31, 2022 for U.S. Appl. No. 17/240,102.
Notice of Allowance dated Nov. 4, 2021 for Japanese Patent Application No. 2018-511347 (with English translation).
Notification of Publication dated Nov. 11, 2021 for Chinese Application No. 202080022559.8 (with English translation).
First Office Action dated Nov. 3, 2021 for Canadian Patent Application No. 2,963,134.
First Office Action dated Oct. 23, 2020 for Chinese Application No. 2018800402400.
Notification of Reasons for Refusal, Office Action dated Jan. 4, 2022, for Japanese Patent Appl. 2019-548272 (8 pages with English translation).
For U.S. Appl. No. 15/515,664, filed Mar. 30, 2017: Responses filed Jan. 10, 2020, Sep. 10, 2020, Jul. 27, 2021 Notice of Allowance dated Aug. 23, 2021.
English translation of Search Report from Chinese Patent Office for Application No. 201580063483.2 dated Sep. 11, 2018.
Office Action from Chinese Patent Office for Application No. 201580063483.2 dated Sep. 25, 2018 (with English translation).
IAEI, When continuity snaps, May-Jun. 2015.
IAEI, Supports reinforce our safety, Hanging Support Systems, Mar.-Apr. 2015.
International Search Report and Written Opinion for PCT/US2021/030568, filed May 4, 2021.
For European Patent Application EP18764255.8: Office Action dated May 10, 2024.
Office Action for U.S. Appl. No. 16/491,321, dated Apr. 21, 2020.
International Search Report for PCT/IL99/00499 filed Sep. 14, 1999.
European Search Report for EP 01 27 4757 dated Mar. 28, 2006.
Australian Examiner's First Report on Patent Application AU 2002221000.
Indian First Examination Report dated Jun. 24, 2010 for Indian Application No. 1677/KOLNP/2006.
New Zealand Examination Report for NZ Patent Application No. 533697 dated May 9, 2007.
For Chinese Patent Application No. 01823877.7: Notice of Allowance dated Oct. 17, 2006 Second Office Action dated Apr. 6, 2007 First Office Action dated Jul. 4, 2006.
Office Action for U.S. Appl. No. 15/515,664, dated Sep. 10, 2019.
International Preliminary Report on Patentability dated Sep. 10, 2019 for PCT/US2018/020987, filed Mar. 5, 2018.
International Search Report dated Jul. 6, 2018 for PCT/US2018/027956 filed Apr. 17, 2018.
Written Opinion Jul. 6, 2018 for PCT/US2018/027956 filed Apr. 17, 2018.
International Search Report dated May 17, 2018 for PCT/US2018/021919 filed Mar. 12, 2018.
Witten Opinion for PCT/US2018/021919 filed Mar. 12, 2018.
International Preliminary Report on Patentability dated Sep. 10, 2019 for PCT/US2018/021919.
International Search Report dated Aug. 13, 2018 for PCT/US2018/030372 filed May 1, 2018.
Written Opinion dated Aug. 13, 2018 for PCT/US2018/030372 filed May 1, 2018.
International Preliminary Report on Patentability dated Oct. 22, 2019 for PCT/US2018/027956.
Final Office Action for U.S. Appl. No. 15/515,664, dated Mar. 10, 2020.
Office Action for US Patent Appl. Nol. U.S. Appl. No. 16/443,207, dated Mar. 11, 2020.
For U.S. Appl. No. 16/605,994: Notice of Allowance dated Jun. 29, 2020.
First Examination Report dated Jun. 2, 2020 for Indian Patent No. 201717042509 filed Nov. 27, 2017.
Office Action dated Aug. 29, 2024 from Korean Application No. 10-2021-7030147 filed Sep. 17, 2021.
Office Action dated Jan. 26, 2022, for European Patent Application No. 18 763 646.9 (National Stage of PCT/US2018/020987) (6 pages).
For Mexican Patent Application No. MX/A/2017/014475 (national Stage of PCT/US2016/032170): Office Action dated Feb. 3, 2021, with English translation.
First Examination Report dated Mar. 25, 2021 for Indian Patent Application No. 201937040845.
Chinese Patent Application No. 2018800402400 (National Stage of PCT/US2018/030372): Second Office Action, dated Jun. 1, 2021.

* cited by examiner

QUICK CONNECT DEVICE WITH WIRE COVER

RELATED PATENTS AND APPLICATIONS

This disclosure relates to U.S. patent Application No. U.S. Patent Application No. 62/486,132 filed Apr. 17, 2017; PCT International Patent Application No. PCT/US18/27956 filed Apr. 17, 2018 (published as WO 2018/195068 A1); U.S. Patent Application No. 62/467,176 filed Mar. 5, 2017; PCT International Patent Application No. PCT/US2016/032170 filed May 12, 2016 (published as WO 2016/183354 A1); U.S. Pat. No. 7,462,066 filed Mar. 20, 2007; U.S. Pat. No. 7,192,303 filed Dec. 2, 2004; and U.S. Pat. No. 6,962,498 filed Dec. 12, 2001; and to U.S. Patent Application Publication No. 2009/0280673 filed Dec. 2, 2005; U.S. Provisional Applications 62/160,585 filed May 12, 2015; 62/308,718, filed Mar. 15, 2016; 62/467,176 filed Mar. 5, 2017; U.S. Pat. No. 62/470,170 filed Mar. 10, 2017; 62/515,464, filed Jun. 5, 2017; and U.S. Patent Application No. 62/807,889 filed Feb. 20, 2019, the contents of all of which are hereby incorporated by reference herein, in their entirety.

FIELD OF THE DISCLOSURE

This disclosure relates to suspended electrical fixtures, and more particularly to suspended electrical fixtures using a tool-less connect and disconnect electrical connection.

BACKGROUND OF THE DISCLOSURE

The dangers of exposed electrical wires are well known. Applicant's prior work as evidenced by the above-identified patent documents relates to efforts to address these dangers. This disclosure relates to providing additional safety with electrical wires.

These patent documents disclose various embodiments of quick connect devices and lighting fixtures which can be safely connected to a source of electrical power and signal without the use of tools. In particular, these related patents and applications disclose various embodiments of plug and socket combinations that permit quick connection of an electrical fixture or appliance at an electrical junction box on a wall or ceiling. The socket is secured on the wall or ceiling near electrical power supply wiring and includes female receptacles which receive male electrical prongs carried on the plug. The electrical fixture is secured to the plug. In addition to the quick electrical connection provided by this plug and socket combination, a mechanical connection between the plug and socket carries the mechanical load of the electrical fixture.

This disclosure sets forth improvements related to various embodiments of the plug and socket combinations in the related patents and applications having a wire cover. Lighting fixtures that include or are retrofitted to provide plug and socket combinations with a wire cover are also disclosed.

SUMMARY OF THE DISCLOSURE

A device of the disclosure connects an electrical fixture with an electrical signal and mounts the fixture on a support. The device includes a socket including a socket body having a plurality of ring shaped internal cavities therein; an electrically conductive contact terminal disposed within each of a plurality of the cavities for establishing an electrical connection between an electrical signal and the socket; a bore formed within the socket and including a narrowed portion; a plug attachable to the fixture the plug having a body including a plurality of electrical terminals accessible from an exterior of the body; the plug having a plurality of ring shaped electrical contacts each mateably passable through a ring shaped internal cavity of the socket and engageable with a contact terminal within the socket to establish a circuit between the electrical fixture and the electrical signal; the fixture electrically connectible to the plurality of ring shaped electrical contacts of the plug by connecting one or more wires of the fixture each to one of the plurality of electrical terminals of the plug; a spindle connected to the plug and insertable into the bore of the socket; a pin slideable within the spindle; one or more channels extending through the spindle; one or more retaining balls each disposed within one of the one or more channels; the pin cooperative with the retaining balls and channels to slide within the spindle to a latch position to push the one or more retaining balls radially outwards within their respective channels to engage the narrowed portion of the socket bore to retain the spindle within the socket bore, and slide within the spindle to an unlatched position to not push the one or more retaining balls radially outwards within their respective channels to thereby enable release of the spindle from within the socket bore.

The device further comprises an extension extending from a side of the plug body opposite to the spindle in a direction away from the body and spindle, the extension including a hollow center and a slot passing through an axially extending peripheral wall of the extension to communicate the hollow center to an exterior of the extension; and a removable cover attachable to the body of the plug, the cover sized to cover the plurality of electrical terminals of the plug, the removable cover including an extension portion extendable from a periphery of the body to the extension.

In another variation thereof, the extension is positioned at an axial center of the body; the hollow center of the extension is sized to receive the one or more wires of the fixture, and the slot is sized to admit passage of the one or more wires of the fixture into the channel without a requirement of first passing an end of the one or more wires through the hollow center.

In still further variations, the body includes a recessed channel extending from the extension to a periphery of the body; and/or the recessed channel receives the one or more wires after the one or more wires have been passed into the channel, the one or more wires thereby passing through an end of the hollow channel to a periphery of the body, the one or more wires pass from the periphery of the body each to one of the plurality of terminals of the plug; and/or the removable cover is sized to cover the one or more wires when the one or more wires are each connected to one of the plurality of terminals of the plug.

In a further variation thereof, the removable cover includes a first portion which covers a portion of a side of the body from which the spindle extends, and a second portion which extends along a portion of side of the body from which the extension extends, extending between a periphery of the body and the extension, the removable cover thereby forming a sandwich containing at least a portion of opposite sides of the plug body.

In other variations, the device further includes a second cover portion which covers substantially all of a side of the plug body from which the extension extends, except for the portion of the body covered by the extension portion of the removable cover; the extension includes threads; the device further includes a ferrule attachable to the extension; the ferrule is attachable to the one or more wires of the fixture by compression; the extension includes threads, the ferrule threadably attachable to the extension; and/or the extension compresses the wires when the ferrule is threaded to the extension.

In additional variations, the device further includes a release lever disposed within the plug, slideable to engage the pin to move the pin from the latched position to the unlatched position; the device further includes an end effector attached to the release lever, the end effector movable along an axis transverse to an axis of the spindle to move the release lever; the end effector is passable through an opening in the body; and/or the body includes a portion forming an elongate channel through the body sized to receive and guide the end effector as the end effector is moved.

In yet further variations, the device further includes a plurality of sensors attached to the body; and/or the device further includes a canopy including a push button disposed upon a periphery of the canopy, the push button contactable with the end effector to move the end effector.

BRIEF DESCRIPTION OF THE DRAWINGS

A more complete understanding of the disclosure, and the attendant advantages and features thereof, will be more readily understood by reference to the following detailed description when considered in conjunction with the accompanying drawings, in which.

DETAILED DESCRIPTION OF THE DISCLOSURE

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The term "discreet," as well as derivatives thereof, references to the amount of skin exposed by a user of the garment, rather than the type of style of the garment. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Headings are provided for the convenience of the reader and are not intended to be limiting in any way.

The disclosure herein relates to the inventor's prior work, such as that set forth in the associated documents filed together herewith, the contents of each of which are herein incorporated in their entirety by reference. This disclosure relates to providing additional safety for electrical fixtures supported/suspended by electrical wires and sets forth improvements related to various embodiments of the plug and socket combinations in related patents and applications of the inventor which include a suspension cable carrying electricity. Lighting fixtures that include or are retrofitted to provide plug and socket combinations with a wire cover are additionally disclosed herein.

As described in additional detail in the incorporated references, the plug and/or socket can include a sensing unit for at least one of wirelessly communicating a sensed condition and wirelessly receiving a signal, particularly as disclosed in PCT International Patent Application No. PCT/US2016/032170 filed May 12, 2016 and PCT International Patent Application No. PCT/US2018/020987 filed Mar. 5, 2018.

A "quick connect device" for installing electrical fixtures comprises the combination of a plug and mating socket, which is also known as a receptacle. This combination is described in great detail in the incorporated references, and is summarized herein for the convenience of the reader. The plug and mating socket of the device function to both establish an electrical connection between an electrical fixture and electrical supply wiring, and mechanically support the fixture on a surface or base, typically a wall, ceiling or floor surface.

As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture.

The plug is fixedly secured to an electrical fixture, while the socket is secured to either the surface (e.g., wall, ceiling or floor) on which the fixture is to be mounted, or to an electrical junction box. The structure, function, and operation of the plug and mating socket, generally, have already been detailed in, for example, the patents and application incorporated by reference herein.

With reference to FIGS. 14-18, and with additional reference for example to the incorporated reference published as PCT/US2016/032170 (the "'170 publication"), a quick connect device 300 for installing electrical fixtures comprises the combination of a plug 500 and mating socket 400. In addition to the description herein, a further detailed description of the structure and function of a plug 300 is provided in the '170 publication and other incorporated references. A plug and socket quick connect is further described in the U.S. National Electric Code.

Figure 17:
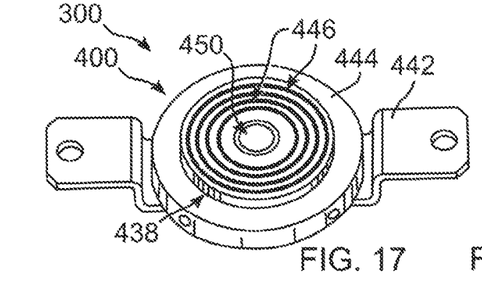
FIG. 17 depicts a view of a socket of the disclosure, useable together with a plug of the disclosure.
Figure 18:
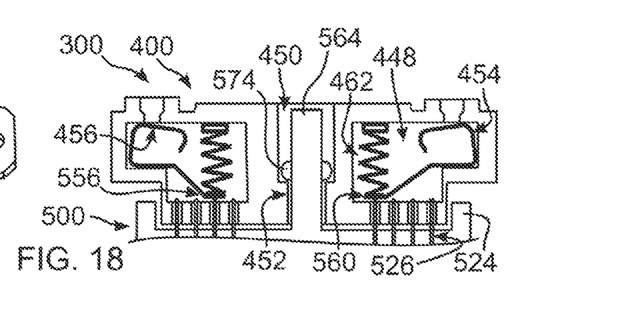
FIG. 18 depicts a cross section of a socket and plug, as useable within the disclosure.

The basic functionality of socket 400 and plug 500 are known, as disclosed in the incorporated references, and as codified in the U.S. National Electric Code. By way of review, as can be seen in FIGS. 17-18, socket 400 may include a mounting strap 442 for attaching socket 400 to an electrical box or other supporting structure. A hollow body 444 includes a plurality of concentric ring-shaped openings 446 which are open to the hollow interior 448 of body 444. A central bore 450 defines a bore diameter, and at least one narrowed bore diameter portion 452. A plurality of internal conductors 454 are each connectable at a connection end 456 to an electrical source of power and/or signal (hereinafter collectively "signal"), and at a contact end 458 to contactor 460. Each of the contactors 460 is positioned adjacent to an end of a ring-shaped opening 446 within the interior 448, and is biased in a direction of ring shaped opening 446, for example by a contactor spring 462.

Plug 500 includes a body 524 supporting a plurality of concentric conductive rings 526 each connected by an internal conductor 534 to a terminal 536 (FIG. 14) to which can be attached an electrical signal. A wire entry port 536A for inserting a wire into terminal 536 can be seen along a side surface of body 524. As can be seen in FIG. 18, each of the conductive rings 526 is insertable into one of the ring-shaped openings 446 to make contact with a contactor 460, which is positioned to contact an inserted conductive ring 526 along at least one area about the perimeter of conductive ring 526. Alignment spline 538 can be disposed about a peripheral portion of body 524, positioned to mate with alignment spline 438 of socket 400, to prevent radial rotation of plug 500 relative to socket 400 after plug 500 and socket 400 are connected.

A spindle 564 having a hollow spindle bore 566 is connected to body 524 to extend axially away from a center of body 524. A pin 568 having at least one narrowed pin diameter portion 570 is slidable within spindle bore 566. Spindle 564 includes one or more radial channels 572. Pin 568 can be slid within bore 566 to position narrowed pin diameter portion 570 adjacent a radial channel, in an unlatched position of pin 568. One or more retaining balls 574 are each positioned within a radial channel.

Spindle 564 is inserted within socket bore 450 when connecting socket 400 and plug 500, when pin 568 is in the unlatched position. In this position, narrowed bore diameter portion 452 of socket 400 can urge retaining balls 574 within the narrowed bore diameter portion 452 radially inwards towards a central axis of spindle bore 566, whereby a portion of each retaining ball 574 lies within channel 572, and a portion lies within the narrowed pin diameter portion 570. When spindle 564 is fully inserted within socket bore 450, radial channels 572 are positioned outside of narrowed bore diameter portion 452 within the larger diameter of socket bore 450. As such, pin 568 can be slid within spindle bore 566 to position narrowed bore diameter portion 452 away from and out of alignment with any of radial channels 572, to a latched position. In the latched position, each of retaining balls 574 is forced radially outwards by the wider general diameter of pin 568 to be positioned partly within radial channel 572 and to extend partly outside of radial channel 572 to lie partly within the larger diameter of socket bore 450. As such, a diameter defined by a retaining ball extending in this manner together with the diameter of spindle 564 is greater than the diameter of narrowed bore diameter portion 452, and spindle is thus unable to pass through narrowed bore diameter portion 452 and cannot be withdrawn from socket 400.

Figures 14, 15:
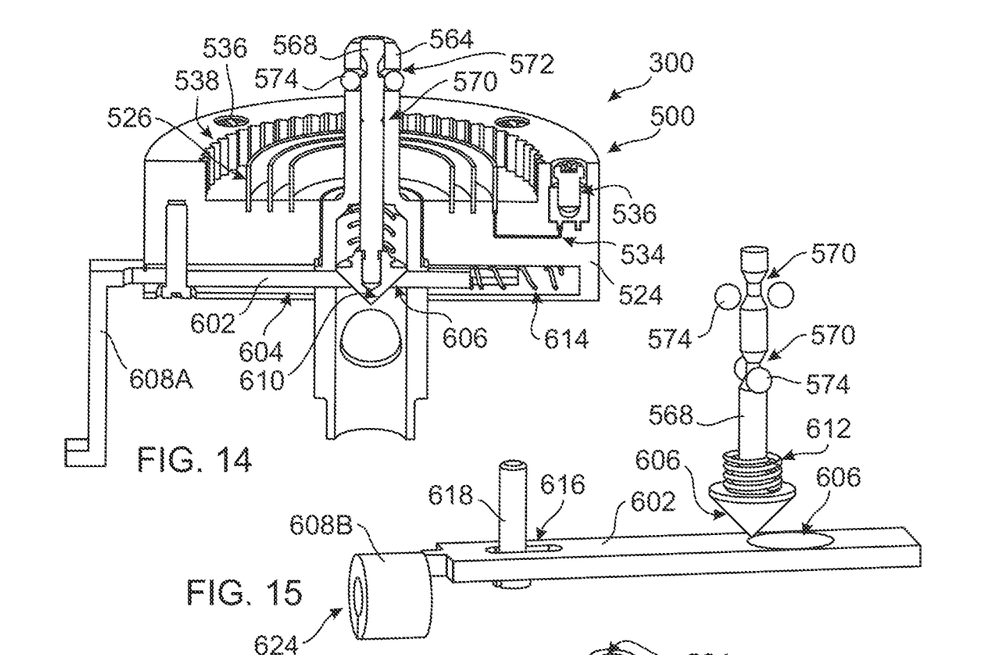
FIG. 14 depicts internal components useable within the plug of FIG. 1, including a side release mechanism.
FIG. 15 depicts the components and side release mechanism of FIG. 14, portions of the release mechanism isolated from remaining internal components.
Figure 16:
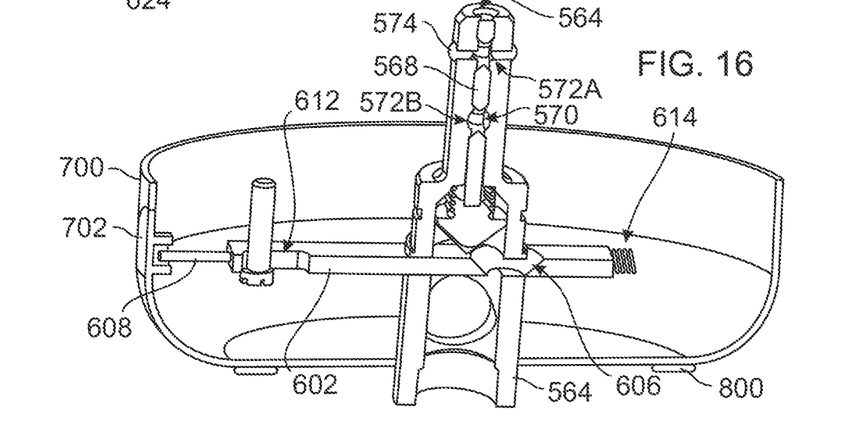
FIG. 16 depicts components of the side release mechanism of FIG. 14 disposed within a canopy, the canopy supporting sensors, with remaining components of the plug removed for clarity, the canopy including a side release button.

In an embodiment shown in FIGS. 15-16, two radial channels 572A, 572B, thus configured, but disposed 90 degrees offset relative to each other, to provide additional pull-out strength. Additional detail is provided in the incorporated references.

As described above, pin 568 is moved axially within spindle bore 566 to move between latched and unlatched positions. In another embodiment, FIGS. 14-16 illustrates that a radial motion can be translated to cause axial motion of pin 568. More particularly, a release lever 602 is slidingly received in a channel 604 that is transverse to a central axis of socket 500. Lever 602 includes a lever cam surface 606.

Further, pin 568 is provided with a cam follower 610 which slidingly mates with lever cam surface 606. Mating engagement of lever cam surface 606 and pin cam follower 610 enables pin 568 to move into the latched position, urged by a cam spring 612 which is positioned between a surface of spindle 564 (as shown) or body 524 and a surface of pin 568 or a surface attached to pin 568 (as shown). A lever spring 614 extending between body 524 and release lever 602 urges release lever 602 into this mating position to further encourage locking of plug 500 to socket 400.

An end effector 608/608A/608B is disposed at an end of lever 602 and is pushed or pulled to move lever cam surface out of mating engagement with pin cam surface 606, and to drive pin 568 into an unlatched position. End effectors 608, 608B are substantially aligned with an axis of movement of release lever 602, while end effector 608A includes a portion that is substantially offset from this axis. An offset can be selected which positions end effector 608 in a convenient location for use. Guide channel 616 and guide pin 618 cooperate can be provided to define a limit of movement of lever 602, as well as to guide movement of lever 602. An end effector connector 624 can be provided into which an end effector 608 can be inserted or otherwise attached. Additional detail is provided in the incorporated references.

FIG. 16 depicts a canopy 700 positioned to cover spindle 564, release lever 602, and a reminder of plug 500 (portions not shown in FIG. 16). As detailed in the '170 publication, one or more sensors 800 or other receiving/input or transmitting/output electronic or electrical devices (hereinafter collectively 'sensors') can be associated with either plug 500 or socket 400. These can be positioned, for example, upon canopy 700. An electrical wire (not shown) can pass from sensor 800 to a terminal 536 on plug body 524, to be electrically connected to a conductive ring 526 by a conductor, as described herein. The presence of such sensors 800 may render the associated device a 'smart' device, which can be a power consuming device such as a light or fan, which may or may not include 'smart' electronics or components, or other electronics which are unrelated to the operation of the device itself.

A lever actuator button 702 can be positioned upon canopy 700 to be aligned with end effector 608, and can be pressed to contact end effector to thereby push release lever 602 to move pin 568 to the unlatched position. FIG. 16 depicts pin 568 in the unlatched position, with pin cam follower 610 out of mating engagement with lever cam surface 606.

This disclosure further relates to providing an additional safety feature of covering the wires connecting a quick connect device to an electrical fixture. With reference to FIGS. 1-10, a plug 500 is shown, which together with a socket 400, forms a quick connect device 300. A device 100 of the disclosure includes a plug 500A and a removable cover portion 802. Plug 500 defines an upper portion which includes spindle 564, and a bottom portion on a side opposite to spindle 564, which, in some embodiment, may include openings into an interior of body 524. Fixed cover portion 900 and removable cover portion 902 are mateable to form a combined cover which covers and conceals lower surface 576, preventing inadvertent access into the interior of body 524, and providing a contiguous surface which is changeable to accommodate a décor design.

Further, removable cover portion 902 covers and conceals electrical wires 912, as well as terminals 536 and terminal ports 536A to which they are attached, rendering device 100 safer from accidental contact with a terminal 256 or terminal port 536A by a hand or object, particularly a conductive object, although as may be seen the conductive portions of terminal 256 are recessed. Further, with reference to FIG. 4, wires 912 are protected by removable cover 902 from being pushed, pulled, or otherwise dislodged from terminals 536 and terminal ports 536A, and from being damaged.

Fixed cover portion 900 and/or removable cover portion 902 can be permanently or removably attached to body 524 during the manufacture of plug 500A, or can be permanently or removably attached by the installer or consumer. Removable cover portion 902, in particular, is advantageously provided as a removable component when it is expected that a suspending cord will be installed by an installer or consumer as detailed further below. Fixed component is advantageously pre-affixed as it normally does not need to be removed when device 100 is installed. When cover portion 900 or 902 is to be permanently affixed, it may be attached by a fastener, such as a screw or clip, or an adhesive, or may be snap-fit or attached using an interference fit. When cover portion 900 or 902 is to be removably affixed, it may also be affixed by any of the foregoing methods, although a snap-fit, interference fit, or other tool-less attachment may be the quickest method for easy reversible attachment. An underside of body 524 can be molded or otherwise configured with openings or shapes which cooperate with openings or attachment shapes (not shown) upon a mating surface of cover portion 900 or 902.

Fixed cover portion 900 and removable cover portion 902 can be formed of an electrically non-conductive material to reduce a possibility of electrical transmission, improving safety. Non-limiting example materials include a polymer, glass, fiberglass or other fibrous material, resin, a natural material such as wood, and/or a paper/pulp based material. The material may provide a natural color and finish, or may be treated or painted to have a desired finish and color. In use, body 524 can be disposed to lie within a wall or ceiling, with only cover portions 900 and 902 visible at the wall or ceiling surface. For example, body 524 can be disposed within an electrical box concealed by the wall or ceiling face and cover portions 900 and 902. In an embodiment, cover portions 900 and 902 can be sized larger than body 524, or can include flanges which extend beyond a diameter of body 524, whereby an opening in the wall or ceiling can be covered and concealed.

Figures 1, 2, 3, 4:
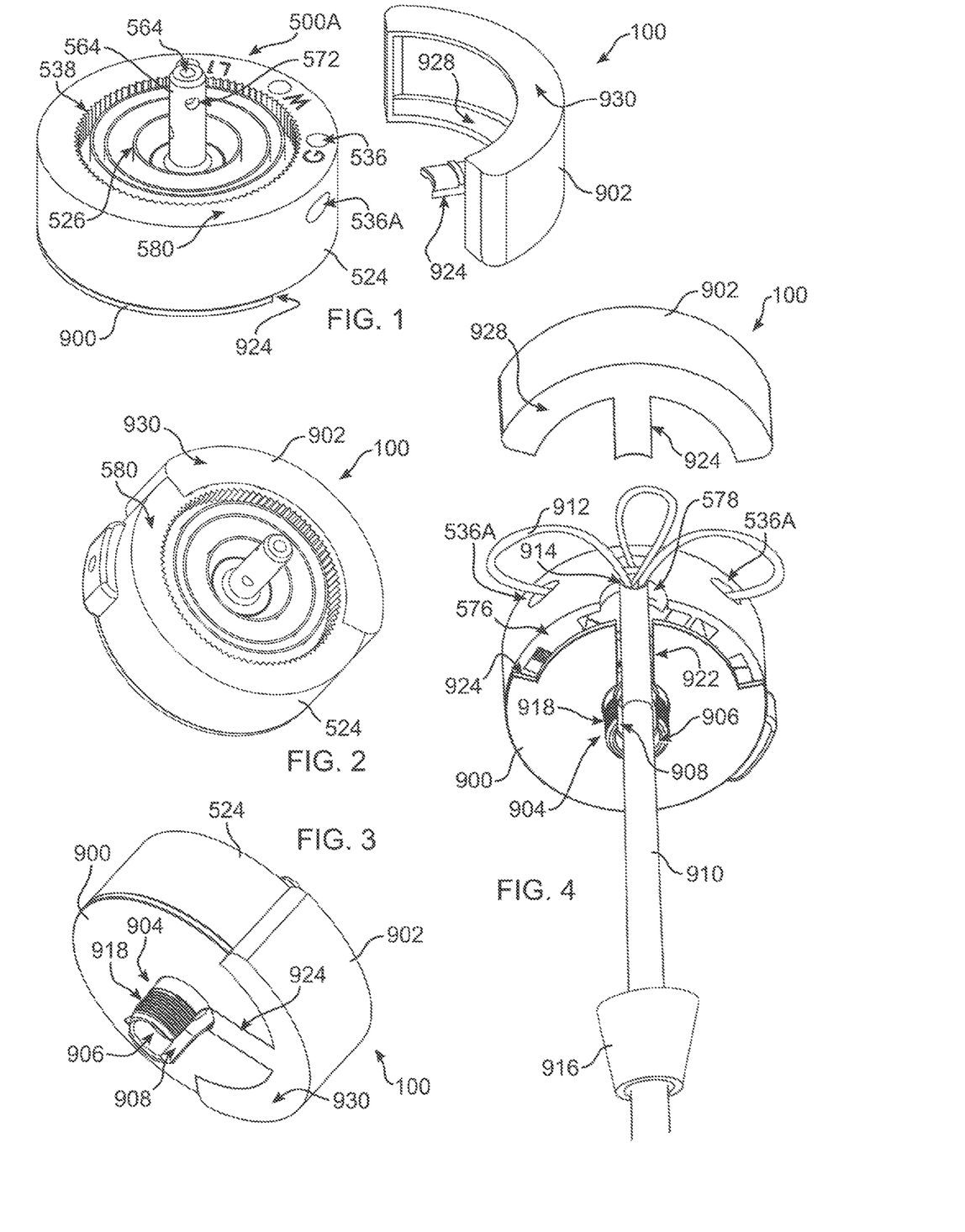
FIG. 1 depicts a perspective view of a plug according to the disclosure, together with a detached cover portion.
FIG. 2 depicts another perspective view of the plug of FIG. 1, with the cover portion attached.
FIG. 3 depicts a bottom perspective view of the plug of FIG. 1, with the cover portion attached, and showing a mounting extension with a wire slot.
FIG. 4 depicts the plug of FIG. 1 together with an electrical fixture attached, showing two portions of the cover, with one cover portion removed to show electrical connections.
Figures 9, 10, 11, 12, 13:
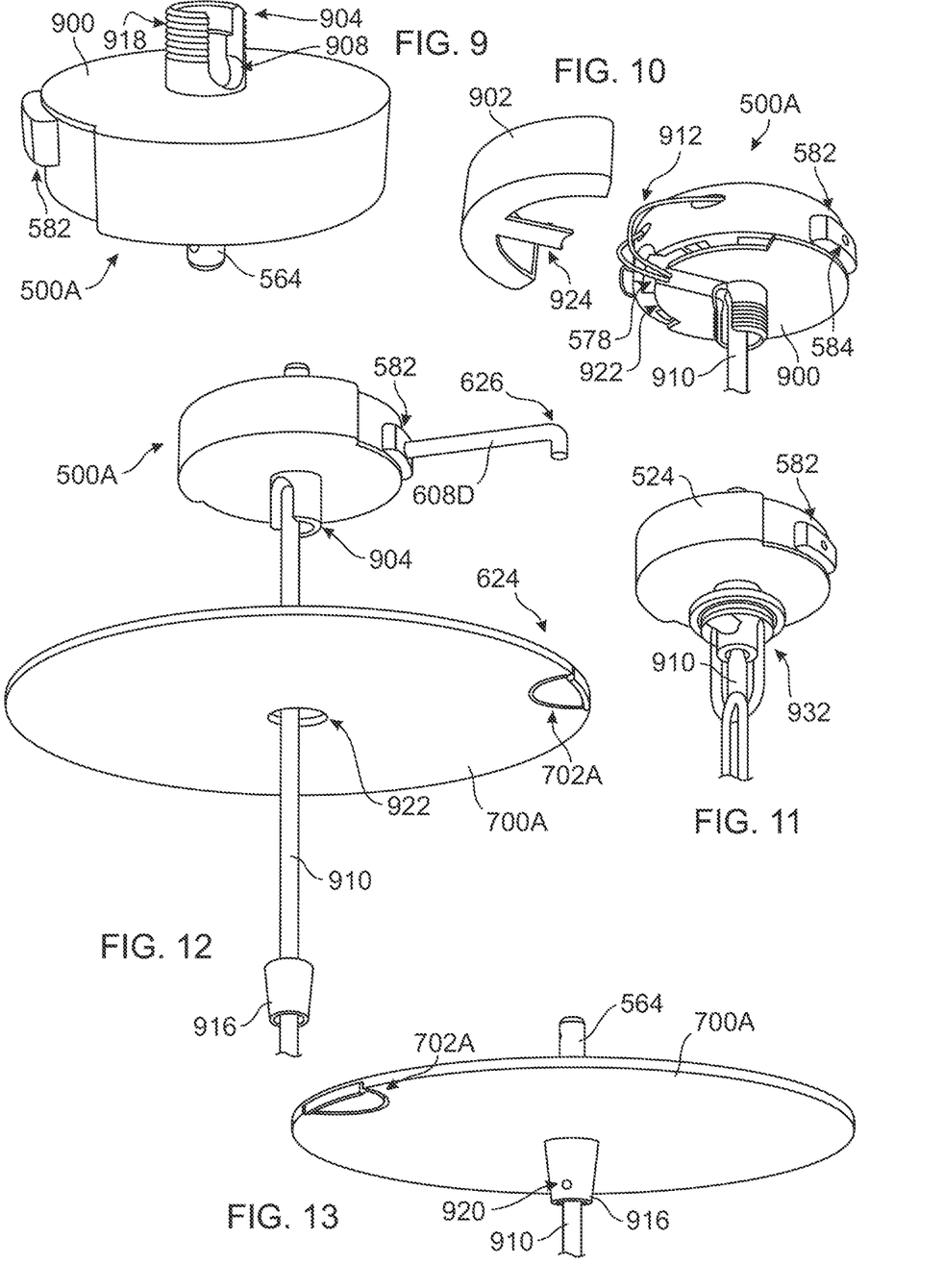
FIG. 9 depicts another perspective view of the plug of FIG. 1.
FIG. 10 depicts an alternative perspective view of the plug and attached electrical device of FIG. 4.
FIG. 11 depicts the plug of FIG. 1 with an attached hangar for connecting a chain and electrical device attached to the chain to the plug of FIG. 1.
FIG. 12 depicts a flat canopy useable together with the plug of FIG. 1, with a vertically connected actuator and release button of the disclosure, the canopy and release lever detached.
FIG. 13 depicts the canopy of FIG. 12, attached to the plug.

As can be seen in FIGS. 3 and 9-10, spindle 564 includes a hollow extension 904 protruding away from lower surface 576. Alternatively, extension 904 is affixed to body 524. In an embodiment, extension 904 is tubular and includes a central channel 906 through which a cable, rod, pole, conduit or other suspending structure 910 can pass. In various embodiments, extension 904 includes an external thread (as illustrated), internal thread, or other external or internal attachment mechanism. In this manner a bracket, hanger 932, rode, pole, conduit, chain (FIG. 11), or other structure can be affixed to extension 904, and thus be affixed to device 100.

As illustrated, suspending structure 910 can be a set of wires 912 encased in a flexible jacket 914. For example, readily available "pendant" wire is specifically intended for suspension of electrical fixtures. Such wire can be flexible without forming kinks, and can be reinforced to support additional weight. As shown, extension 904 includes an axially extending slot 908 through which suspending structure 910 can be passed to lie within channel 906, as can be seen in FIGS. 4 and 10. It may further be seen that suspending structure 910 is bent at 90 degrees at a base of extension 904, and extends to a periphery of body 524, where electrical wires 912 emerge from flexible jacket 914. Electrical wires 912, as illustrated, form an electrical connection at terminals 536, whereby an electrical connection is be made with a socket 400 when plugged into plug 500, as described herein.

With further reference to FIG. 4, and with reference to FIG. 13, suspending structure 910 can pass through a cap or ferrule 916, the ferrule attachable to extension 904 to conceal extension 904. In an embodiment, ferrule 916 attaches to extension 904, for example threadably attaching to threads 918, and includes a compressible insert (not shown) which together with ferrule 916 forms a compression connector, the insert narrowing to clamp suspending structure 910 to provide strain relief and to anchor suspending structure 910 to body 524. Alternatively, in an embodiment, ferrule 916 compresses extension 904, reducing a diameter of a portion of extension 904 in order to clamp suspending structure 910. In a further alternative, as shown in FIG. 13, a set screw 920 within ferrule 916 bears upon suspending structure 910, or bears upon an internal plate that bears upon suspending structure 910, in order to secure suspending structure 910 to ferrule 916. In turn, ferrule 916 is affixed to extension 904 by other means, for example threads 918. In a still further alternative, suspending structure 910 is affixed to body 524 by a clip or clamp.

With further regard to cover portions 900, 902, it may be seen that fixed cover portion 900 includes a slot 922 sized to expose a wire channel 578 disposed within lower surface 576 of body 524, into which suspending structure 910 can be positioned after turning 90 degrees at a base of extension 904. Slot 922 is positioned to align with and communicate with extension slot 908, to facilitate positioning of suspending structure 910 within extension slot 908 and wire channel 578. In turn, removable cover portion 902 includes a channel cover extension 922 sized to fit into or over slot 922 to conceal wire channel 578 and the portion of suspending structure 910 within wire channel 578. Channel cover extension 922 can serve to provide strain relief support for suspending structure 910, preventing suspending structure 910 from leaving wire channel 578.

Similarly, fixed cover portion additionally can include a peripheral cutout portion 926 which exposes a portion of base lower surface 576. In turn, removable cover portion 902 can include a peripheral cover flange 928 that covers this portion of exposed lower surface 576. Additionally, cover portion 920 can include an upper flange 930 positionable on an upper surface 580 of base 524, opposite to lower surface 576. In this manner, base 524 can be clamped or clipped between peripheral cover flange 928 and upper flange 930, in order to releasably retain removable cover portion 902 upon base 524. A recess (not shown) can be formed in upper surface 580 sized and dimensioned to receive upper flange 930 if it is desired not to form a gap between upper surface 580 and a socket 400 that has been connected. In an alternative, fixed cover portion 900 does not include peripheral cutout portion 926, and peripheral cover flange 928 overlies fixed cover portion 902. Upper flange 930 can further serve to cover, and protect from contact with, any exposed terminals 536.

With further reference to FIGS. 2, 5-8, and 11, it may be seen that the embodiment of FIG. 1 can be provided with a side release which functions in the manner described with respect to FIGS. 14-16, or which can use an alternative manner of providing side activated push release, that is currently known or hereafter discovered, for aligning pin 568 into the unlatched position. An end effector portal 582 is provided upon a side surface 584 of base 524, through which a lever end effector 608 can pass to extend from a release mechanism within body 524, such as a release lever 602 for example. End effector portal 582 can extend from base 524 as shown to form a width defining an internal channel which can guide and support end effector 582 as it passes into an interior of base 524, and during use.

Figures 5, 6, 7, 8:
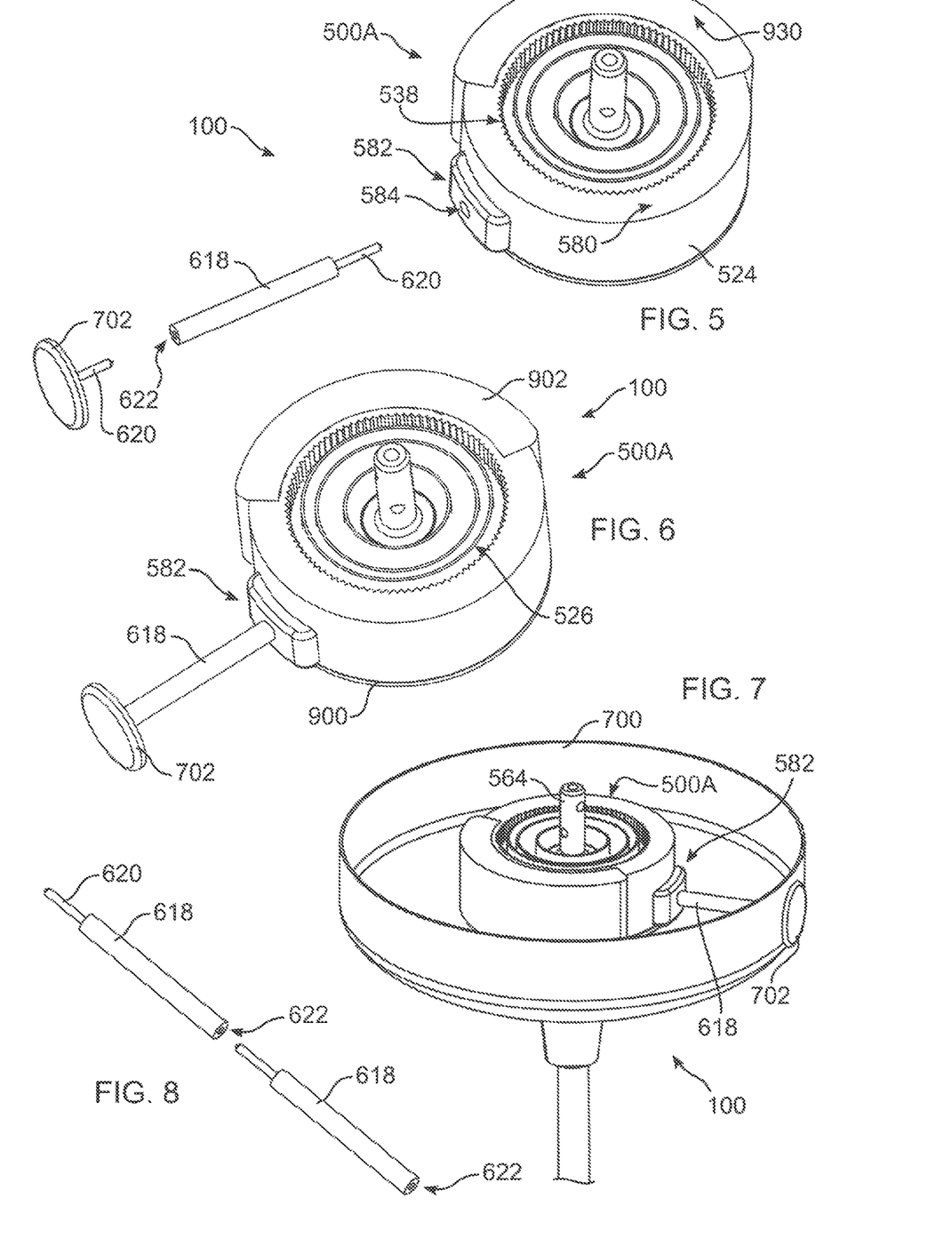
FIG. 5 depicts the plug of FIG. 1 and a side activated mechanism of the disclosure for releasing the mechanical and electrical connections to a socket, the actuator removed and separated into component parts.
FIG. 6 depicts the plug of FIG. 5, the mechanism for releasing the mechanical and electrical connections to a socket assembled and attached actuating lever.
FIG. 7 depicts the plug of FIG. 6 positioned in a canopy of an electrical fixture.
FIG. 8 depicts the actuator mechanism of FIG. 5, showing that a length of the actuator can be changed by combining segments.

As further illustrated in FIGS. 5-8, lever end effector 608C can be provided in end effector segments 616 which are mutually connectable to form an end effector of a desired length. For example, as shown in FIG. 7, a canopy 700 is used which requires only a single end effector segment 616 in order to position lever actuator button 702 at a side surface of canopy 700. However, should canopy 700 have a wider diameter, an additional end effector segment 616 can be attached end to end, as shown in FIG. 8, to position lever actuator button 702 at a correct location about the periphery of canopy 700. Additionally, end effector segments 616 can be provided in various length which can be used alone or combined to achieve a particular combined length. Segments 616 can be reversibly or permanently interconnected using a post 620 inserted into a bore 622 using threads or an interference fit, or segments can be mutually attached by adhesive, clips, or other fastener, or by welding, brazing, or any other manner. An actuator button 702 can be similarly attached.

Turning now to FIGS. 12-13, it may be seen that canopy 700A can be provided as a substantially planar cover and can be used together with the embodiments disclosed herein. More particularly, canopy 700A includes a central aperture 704 having a diameter sized to admit passage of extension 904, whereby canopy 700A can lie coplanar with and close to or against fixed and removable covers 900, 902. As such, an entirety of plug 500 together with covers 900, 902 can be disposed within a wall or ceiling. Once canopy 700A is positioned over extension 904, ferrule 916 can be positioned over extension 904, and affixed to body 524 as described herein. Ferrule 916 has a diameter larger than canopy aperture 704, whereby canopy 700A is secured to base 524 and plug 500.

Canopy 700A includes a peripheral lever actuator button 702A which has an end effector connector 624A, not visible in FIG. 12 but which can have the shape, for example, as shown in FIG. 15. End effector connector 624A is disposed upon actuator button 702A to face in a direction of attached plug 500, on an upper surface (as viewed) of canopy 700A. Lever end effector 608 is bent to form a downward facing (as viewed) end 626, which is insertable into end effector connector 624A, to thereby attach button 702A to end effector 608D. As button 702A is pushed inwards towards an axial center of canopy 700A, end effector 608D moves towards an axial center of body 524, causing pin 568 to move to the unlatched position, which releases plug 500 from socket 400. A channel can be formed in a wall surface to accommodate end effector 608D, if there is insufficient space between the wall or ceiling and an underside of canopy 700A. Alternatively, canopy 700A can be provided with a spacer, or a spacer can be inserted between canopy 700A and a surface of the wall or ceiling.

Thus, the disclosure enables connection of an electrical fixture with an electrical signal, and mounting of the fixture on a support. This mechanical and electrical connection includes the use of a mating socket and plug. The socket has a socket body which has ring shaped internal cavities which lead to electrical terminals. The socket also has a bore that includes a narrowed portion. The plug is attachable to the fixture and has a body that includes electrical terminals connected to ring shaped electrical contacts, which can pass through the ring shaped cavities of the socket to electrically engage the contact terminals within the socket, thereby establishing an electrical circuit between the electrical fixture and the electrical signal. The electrical fixture connects to the ring shaped electrical contacts of the plug by connecting to the electrical terminals of the plug.

To form the mechanical connection between the plug and socket, a spindle connected to the plug is inserted into the bore of the socket. A pin is slideable within the spindle, and the spindle has channels which extending laterally through the spindle. Retaining balls move within the channels. The pin has narrow and wide portions, so that when a wide portion of the pin is moved adjacent to a ball in a channel, to a latched position, the ball is pushed radially outwards to extend into the socket bore where the ball remains partially within the channel but is blocked by the narrowed portion of the socket bore, and when a narrow portion is adjacent the channel in an unlatched position, the retaining ball can move radially inwards so that the retaining balls are not blocked by the narrow portion of the socket bore.

An extension extends from a side of the plug body opposite to the spindle in a direction away from the body and spindle. The extension includes a hollow center and a slot passing through an axially extending peripheral wall of the extension to communicate the hollow center to an exterior of the extension. A removable cover attaches to the body of the plug to the electrical terminals of the plug and has an extension portion extendable from a periphery of the body to the extension.

The extension can be positioned at an axial center of the body. The hollow center of the extension is sized to receive a cable containing one or more wires of the fixture, and the slot is sized to admit passage of the cable into the channel without a requirement of first passing an end of the one or more wires through the hollow center, as would be the case if the extension had an unbroken periphery not interrupted by the slot.

The body can include a recessed channel extending from the extension to a periphery of the body, where the cable can pass through the extension, then turn and lie within the recessed channel and pass to a periphery of the plug body, where the wires can emerge from the cable to each connect to different plug terminal. The removable cover is sized to cover these terminals and connected wire ends, as well as the cable that is lying within the channel.

The removable cover thus covers a portion of a side of the body from which the spindle extends, which can include only the wire channel, or which can additionally include other portions of the extension side of the body. A second part of the cover can overlie a portion of the plug body on the same side of the spindle, whereby the removable cover thereby forms a sandwich covering/containing at least a portion of opposite sides of the plug body. A second cover portion can cover substantially all of the remainder of the side of the plug body from which the extension extends, except for the portion covered by the removable cover.

A ferrule can be attached to the extension and covers at least part of the slot in the extension. The ferrule can be attached to the cable, for example by passing an end of the cable through an end of the ferrule. The ferrule can attach to the cable by compression. The ferrule and extension can be threadable connected to each other, and threading can cause compression of the ferrule to connect the ferrule to the cable.

A release lever can slide within the plug to engage the pin to move the pin from the latched position to the unlatched position. An end effector can be attached to the release lever, where the end effector can be moved along an axis transverse to an axis of the spindle to move the release lever. The end effector can pass through an opening in the body, where the opening can form an elongate channel which receives and guides the end effector as the end effector is moved.

Lights, a fan, a transmitter and/or receiver, environmental condition sensors, intrusion sensors, and other electronic devices, defined herein collectively as "sensors", can be attached directly to the body. Alternatively, the plug body can be attached to a canopy which supports the sensors. The canopy can include a push button positioned upon an exterior surface of the canopy, including for example a periphery of the canopy, where the button can be pushed to move end effector to unlatch the plug and connected electrical device.

All references cited herein are expressly incorporated by reference in their entirety. There are many different features of the present disclosure and it is contemplated that these features may be used together or separately. Unless mention was made above to the contrary, it should be noted that all of the accompanying drawings are not to scale. Thus, the disclosure should not be limited to any particular combination of features or to a particular application of the disclosure. Further, it should be understood that variations and modifications within scope of the disclosure might occur to those skilled in the art to which the disclosure pertains. Accordingly, all expedient modifications readily attainable by one versed in the art from the disclosure set forth herein that are within the scope of the present disclosure are to be included as further embodiments of the present disclosure.

LIST OF REFERENCE NUMERALS 100 electrical fixture device
300 quick connect plug/socket device
400 quick connect socket
438 alignment spline
442 mounting strap
444 hollow body
446 ring shaped opening
448 body interior
450 central bore
452 narrowed bore diameter portion
454 internal conductor
456 conductor connection end
458 conductor contact end
460 contactor
462 contactor spring
500 quick connect plug
524 body
526 conductive ring
534 internal conductor
536 terminal
536A terminal entry port
538 alignment spline
564 spindle
566 spindle bore
568 pin
570 narrowed pin diameter portion
572/572A-B radial channel
574 retaining ball
576 lower surface
578 wire channel
580 upper surface
582 end effector portal
584 portal channel
602 release lever
604 lever channel
606 lever cam surface
608/608A-D lever end effector
610 pin cam follower
612 cam spring
614 lever spring
616 lever guide
618 end effector segment
620 segment post
622 segment bore
624/624A actuator button connector
700/700A canopy
702/702A lever actuator button
704 canopy aperture
800 sensor
900 fixed cover portion
902 removable cover portion
904 hollow extension
906 extension channel
908 extension slot
910 suspending structure
912 electrical wires
914 wire flexible jacket
916 ferrule
918 extension threads
920 ferrule set screw
922 fixed cover slot
924 channel cover extension -continued 926 peripheral cutout portion
928 peripheral cover flange
930 upper flange
932 hanger

What is claimed is:

1. A device for connecting an electrical fixture with an electrical signal, and for mounting the fixture on a support, the device including
a socket including a socket body having a plurality of ring shaped internal cavities therein; an electrically conductive contact terminal disposed within each of a plurality of the cavities for establishing an electrical connection between an electrical signal and the socket;
a bore formed within the socket and including a narrowed portion;
a plug attachable to the fixture the plug having a body including a plurality of electrical terminals accessible from an exterior of the body;
the plug having a plurality of ring shaped electrical contacts each mateably passable through a ring shaped internal cavity of the socket and engageable with a contact terminal within the socket to establish a circuit between the electrical fixture and the electrical signal;
the fixture electrically connectible to the plurality of ring shaped electrical contacts of the plug by connecting one or more wires of the fixture each to one of the plurality of electrical terminals of the plug;
a spindle connected to the plug and insertable into the bore of the socket;
a pin slideable within the spindle;
one or more channels extending through the spindle;
one or more retaining balls each disposed within one of the one or more channels;
the pin cooperative with the retaining balls and channels to
slide within the spindle to a latch position to push the one or more retaining balls radially outwards within their respective channels to engage the narrowed portion of the socket bore to retain the spindle within the socket bore, and
slide within the spindle to an unlatched position to not push the one or more retaining balls radially outwards within their respective channels to thereby enable release of the spindle from within the socket bore;
the device further comprising:
an extension extending from a side of the plug body opposite to the spindle in a direction away from the body and spindle, the extension including a hollow center and a slot passing through an axially extending peripheral wall of the extension to communicate the hollow center to an exterior of the extension; and
a removable cover attachable to the body of the plug, the cover sized to cover the plurality of electrical terminals of the plug, the removable cover including an extension portion extendable from a periphery of the body to the extension.

2. The device of claim 1, the extension positioned at an axial center of the body.

3. The device of claim 1, the hollow center of the extension sized to receive the one or more wires of the fixture, the slot sized to admit passage of the one or more wires of the fixture into the channel without a requirement of first passing an end of the one or more wires through the hollow center.

4. The device of claim 1, the body including a recessed channel extending from the extension to a periphery of the body.

5. The device of claim 3, the body including a recessed channel extending from the extension to a periphery of the body sized to receive the one or more wires after the one or more wires have been passed into the channel, the one or more wires thereby passing through an end of the hollow channel to a periphery of the body.

6. The device of claim 5, the one or more wires passing from the periphery of the body each to one of the plurality of terminals of the plug.

7. The device of claim 5, the removable cover sized to cover the one or more wires when the one or more wires are each connected to one of the plurality of terminals of the plug.

8. The device of claim 1, the removable cover including:
a first portion which covers a portion of a side of the body from which the spindle extends; and
a second portion which extends along a portion of side of the body from which the extension extends, extending between a periphery of the body and the extension;
the removable cover thereby forming a sandwich containing at least a portion of opposite sides of the plug body.

9. The device of claim 1, further including a second cover portion which covers substantially all of a side of the plug body from which the extension extends, except for the portion of the body covered by the extension portion of the removable cover.

10. The device of claim 1, the extension including threads.

11. The device of claim 1, further including a ferrule attachable to the extension.

12. The device of claim 11, the ferrule attachable to the one or more wires of the fixture by compression.

13. The device of claim 12, the extension including threads, the ferrule threadably attachable to the extension.

14. The device of claim 13, the extension compressing the wires when the ferrule is threaded to the extension.

15. The device of claim 1, further including a release lever disposed within the plug and slideable to engage the pin to move the pin from the latched position to the unlatched position.

16. The device of claim 15, further including an end effector attached to the release lever, the end effector movable along an axis transverse to an axis of the spindle to move the release lever.

17. The device of claim 15, the end effector passable through an opening in the body.

18. The device of claim 15, the body including a portion forming an elongate channel through the body sized to receive and guide the end effector as the end effector is moved.

19. The device of claim 1, further including a plurality of sensors attached to the body.

20. The device of claim 16, further including a canopy including a push button disposed upon a periphery of the canopy, the push button contactable with the end effector to move the end effector.

* * * * *